United States Patent
Schwantner

(10) Patent No.: US 12,348,164 B2
(45) Date of Patent: Jul. 1, 2025

(54) END POSITION DETECTION OF ACTUATORS

(71) Applicant: AUDI AG, Ingolstadt (DE)

(72) Inventor: Bernhard Schwantner, Eichstätt (DE)

(73) Assignee: AUDI AG, Ingolstadt (DE)

( * ) Notice: Subject to any disclaimer, the term of this patent is extended or adjusted under 35 U.S.C. 154(b) by 169 days.

(21) Appl. No.: 18/193,084

(22) Filed: Mar. 30, 2023

(65) Prior Publication Data

US 2023/0318503 A1  Oct. 5, 2023

(30) Foreign Application Priority Data

Mar. 30, 2022  (DE) .................. 102022107474.9

(51) Int. Cl.
| | | |
|---|---|---|
| G05B 5/00 | (2006.01) | |
| G01D 5/245 | (2006.01) | |
| H02P 23/00 | (2016.01) | |
| H02P 23/14 | (2006.01) | |
| B60H 1/00 | (2006.01) | |
| B60N 2/02 | (2006.01) | |
| E05B 81/04 | (2014.01) | |

(52) U.S. Cl.
CPC ............ *H02P 23/14* (2013.01); *G01D 5/245* (2013.01); *H02P 23/0022* (2013.01); *B60H 1/00835* (2013.01); *B60N 2/02246* (2023.08); *E05B 81/04* (2013.01)

(58) Field of Classification Search
CPC ... H02P 23/14; H02P 23/022; B60N 2/02246; G01D 5/245; E05B 81/04
See application file for complete search history.

(56) References Cited

U.S. PATENT DOCUMENTS

| | | |
|---|---|---|
| 2012/0304914 A1 | 12/2012 | Russ |
| 2019/0190415 A1 | 6/2019 | Hijikata |

FOREIGN PATENT DOCUMENTS

| | | | | |
|---|---|---|---|---|
| CN | 108028619 B | * | 7/2021 | .............. H02P 6/182 |
| DE | 102012104541 A1 | * | 12/2012 | ................ H02P 8/22 |
| DE | 112017004395 T5 | | 5/2019 | |
| WO | 2008/095750 A1 | | 8/2008 | |
| WO | 2014/091823 A1 | | 6/2014 | |
| WO | 2015/164165 A1 | | 10/2015 | |
| WO | 2021/123279 A1 | | 6/2021 | |

* cited by examiner

Primary Examiner — Karen Masih
(74) Attorney, Agent, or Firm — Seed IP Law Group LLP

(57) ABSTRACT

The present disclosure relates to a method and a device for end position detection of actuators.

8 Claims, 2 Drawing Sheets

END POSITION DETECTION OF ACTUATORS

BACKGROUND

Technical Field

The present disclosure relates to a method and a device for end position detection of actuators.

Description of the Related Art

In modern motor vehicles, many actuators are used, for example, to activate door locks, rear gate locks, air conditioning flaps, mirrors, etc. Usually the end positions of the movement of the actuator are detected by end switches. The end switches and their wiring increase the necessary number of components and the assembly expense during the production of the vehicle.

WO 2015/164 165 A1 discloses a method for determining a position of a magnetic arrangement relative to an array of inductive elements which are arranged in proximity to a magnetically permeable material. The method involves measuring electrical properties of each of the one or more inductive elements of the array of inductive elements. From information derived from the measured electrical properties of the one or more inductive elements of the array of inductive elements, the position of the magnetic arrangement relative to the array of inductive elements is determined.

WO 2014/091 823 A1 relates to a method for determining the position of a needle of an electromagnetic actuator. In this, by applying a graduated voltage having multiple levels to a coil, multiple measurement values are obtained, based on the variation of the coil current when each voltage level is applied, and a first table and a second table are compared, in which the measured values are matched up with fluctuations in the inductance of the coil, and in this way it is possible to determine unambiguously the position of a needle of an electromagnetic actuator.

In WO 2008/095 750 A1 there is presented a device for moving a control element in a motor vehicle having a DC motor standing in operative connection with the control element, an actuation circuit connected to the DC motor, an inductive component across which the motor current of the DC motor is taken, and from which a voltage signal is picked off, and an evaluation unit connected to the inductive component for determining a position of the control element with the voltage signal picked off from the inductive component. The actuation circuit is designed to generate two symmetrical operating voltages which are supplied alternately to the DC motor across a single motor conductor. The position of the motor is determined by the pulse count method.

BRIEF SUMMARY

Embodiments of the disclosure provide a method and a device with which end positions of actuators can be determined without end switches.

Embodiments of the disclosure include a method for detection of an end position of an actuator moved by an electric motor. In the method, the electric motor is actuated by signal pulses and the mutual induction voltages which are generated are measured and added up. If the sum of the measured mutual induction voltages reaches a given value, this is considered to be the reaching of the end position.

The electric motor is actuated by a signal (pulse-width modulated (PWM) signal or full actuation). The mutual induction voltage generated is measured between the actuation signals. The end position of the electric actuator can be detected through the sum of the mutual induction voltages. This is independent of the length of actuation of the motor. Thus, the actuator is fully capable of diagnostics. Hence, end switches in both of the end positions are unnecessary.

Once the sum of the measured mutual induction voltages reaches a given value, this is considered to be the reaching of the end position of the actuator. In one embodiment of the method, the given value is a value contingent upon the specific layout of the actuator, which takes on the same value for all the actuators of a model series. In another embodiment, the given value is determined by teaching a controller for an actuator connected to it, in that the end positions of the actuator are traveled in a learning phase and the values so determined for the sum of the measured mutual induction voltages are memorized in the controller.

In one embodiment of the method, the movement of the actuator is halted upon reaching an end position. This is done by halting the electric motor.

In one embodiment of the method, the actuator moves a latch or a bolt of a lock of a motor vehicle, such as the lock of a door or the lock of a rear trunk, a latch arresting the front hood or the rear hood for a charging socket or a fueling nozzle of the motor vehicle.

In another embodiment of the method, the actuator moves a mirror of a motor vehicle, such as an exterior mirror of the motor vehicle.

In yet another embodiment of the method, the actuator moves a seat of a motor vehicle or parts thereof, such as a seat surface or a backrest of the seat.

In still another embodiment of the method, the actuator moves a ventilation flap of an air conditioning system of a motor vehicle.

In another embodiment of the method, the actuator moves a side window of a motor vehicle.

Embodiments of the also include a module, comprising a controller, at least one electric motor connected to the controller, and at least one actuator which is movable by the electric motor. The controller includes a semiconductor full bridge, to which the at least one electric motor is connected, and a read back input connected to the outputs of the semiconductor full bridge, which forwards the measured signal, i.e., the mutual induction voltages to an analog-to-digital (A/D) converter of the controller. The controller is adapted to add up the mutual induction voltages and compare them to a given end value. In one embodiment, the module is a component of a motor vehicle.

In one embodiment, the controller is adapted to halt the electric motor as soon as the sum of the mutual induction voltages has reached the given end value.

The semiconductor full bridge generates a control signal for control of the at least one electric motor in forward and reverse motion and switches its output to high impedance between the signal pulses (tri-state: Z). By way of the read back input, the mutual induction voltage is measured between the signal pulses and forwarded to an A/D converter of the controller. The digitized signal is added up in the controller and compared to the given end value.

This solution according to the disclosure makes it possible to save on end switches for actuators and the corresponding wiring. Further benefits and embodiments of the disclosure will emerge from the description and the accompanying drawings.

Of course, the features mentioned above and those yet to be explained in the following can be used not only in the particular indicated combination, but also in other combinations or standing alone, without leaving the scope of the present disclosure.

BRIEF DESCRIPTION OF THE SEVERAL VIEWS OF THE DRAWINGS

The disclosure is presented in the drawings with the aid of one embodiment and shall be further explained with reference to the drawings. There are shown.

DETAILED DESCRIPTION

Figure 1:
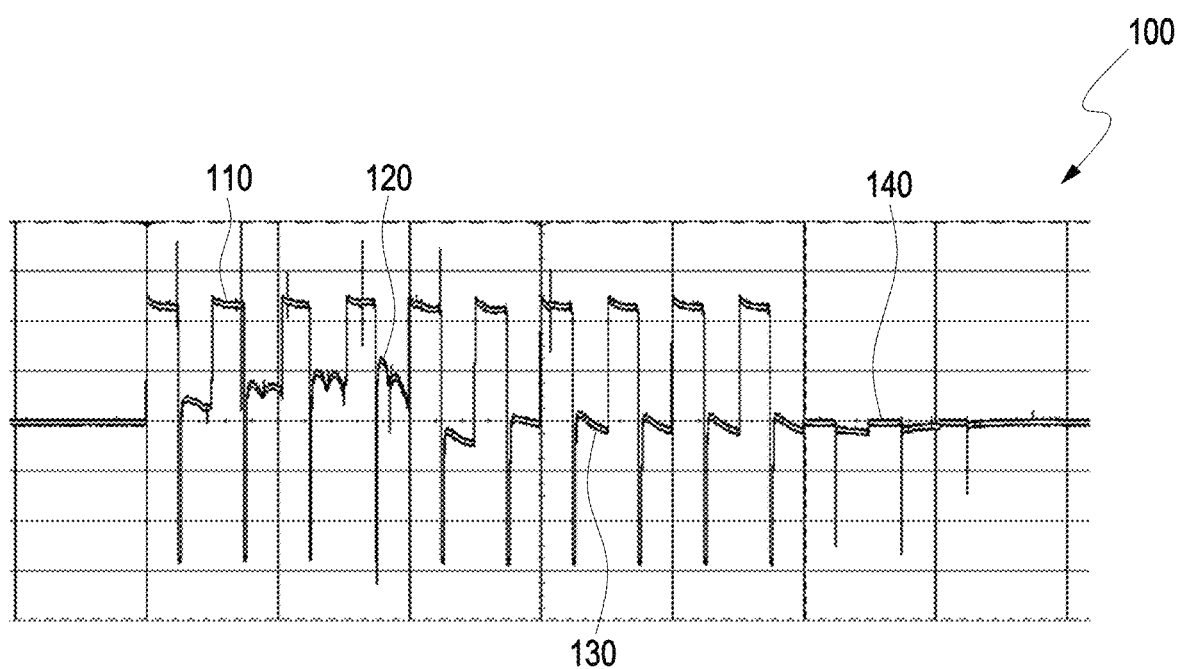
FIG. 1 shows a voltage versus time diagram of a motor control of an actuator according to an embodiment of the disclosure.

FIG. 1 shows a voltage versus time diagram 100 of the motor control of an actuator. A plurality of voltage pulses 110 for motor control and plurality of resulting mutual induction voltages 120 can be readily seen in the diagram. No mutual induction voltage is produced when the motor is blocked 130, or when the motor is short circuited 140. In both instances, the output of the power electronics is switched to high impedance (tri-state: Z).

From the mutual induction voltages 120 occurring during the motor control, it is possible to ascertain a path traveled by the actuator. When the actuator reaches its end position, the sum of the mutual induction voltages 120 also reaches a defined value. Therefore, the sum of the mutual induction voltages 120 can be used for the end position detection of the actuator and the motor of the actuator can be halted before it is blocked.

Figure 2:
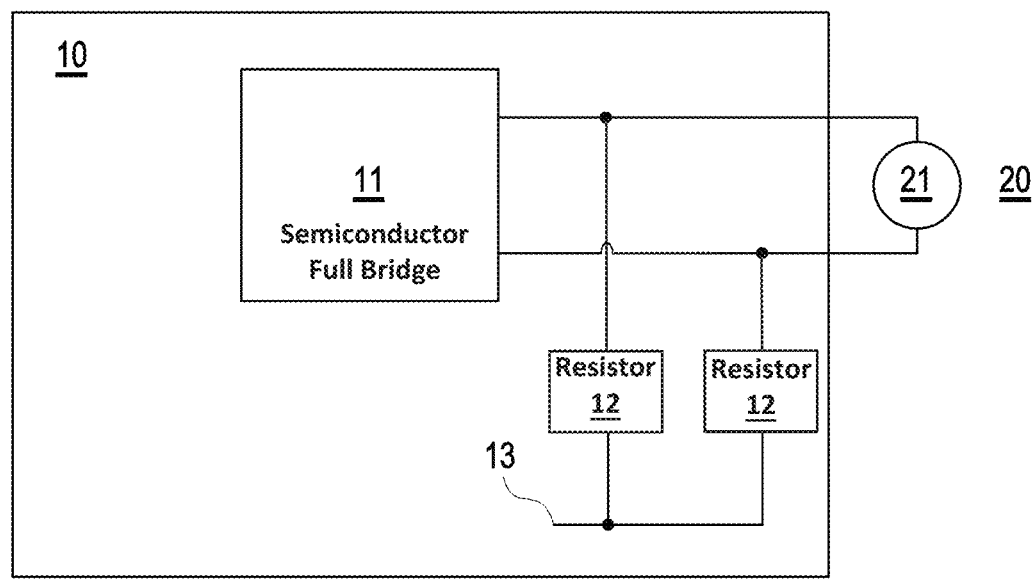
FIG. 2 shows a circuit diagram of a module according to an embodiment of the disclosure with an actuator connected to a controller.

FIG. 2 shows schematically one embodiment of a module according to the disclosure having a controller 10 to which a motor 21 of an actuator 20 is connected. Only the motor 21 of the actuator 20 is shown in the drawing. Motor control occurs through a semiconductor full bridge 11 of the controller 10. A read back input 13 is realized with measuring resistors 12, forwarding the signal to an A/D converter of the controller 10, not shown in the drawing. The mutual induction voltages are added up in the controller 10 and upon reaching the value corresponding to the end position of the actuator 20 the motor 21 is halted and the movement of the actuator 20 is stopped.

Figure 3:
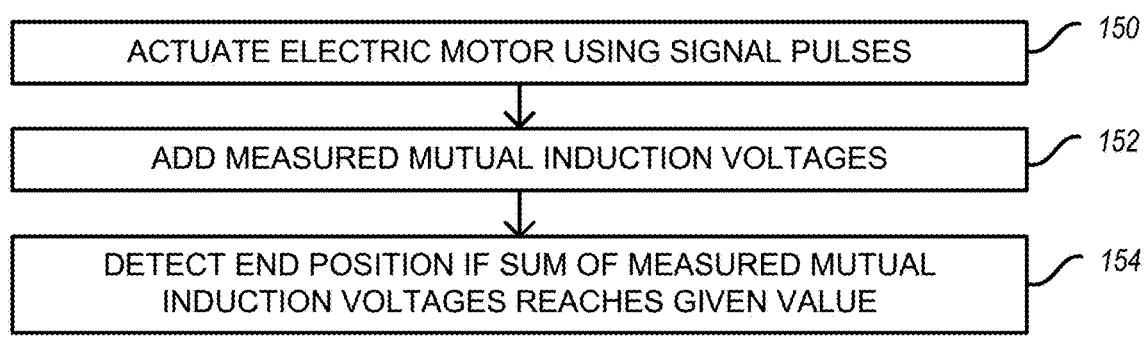
FIG. 3 shows a flowchart of a method according to an embodiment of the disclosure.

FIG. 3 shows a flowchart of a method for detection of an end position of an actuator moved by an electric motor according to an embodiment of the disclosure. At 150, the method includes actuating an electric motor (e.g., motor 21) using signal pulses. At 152, the method includes adding measured mutual induction voltages that are generated by the actuating. At 154, the method includes detecting the end position if a sum of the measured mutual induction voltages reaches a given value.

Figure 4A:
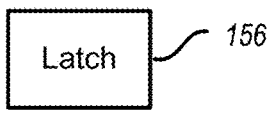
FIGS. 4a, 4b, 4c, 4d, 4e, and 4f show components for aiding in the understanding of various embodiments of the disclosure.
Figure 4B:
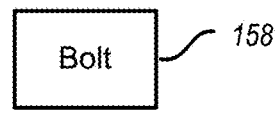
Figure 4C:
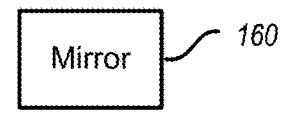
Figure 4D:
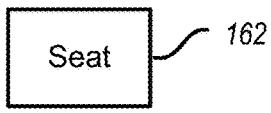
Figure 4E:
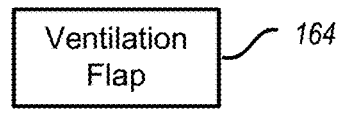
Figure 4F:
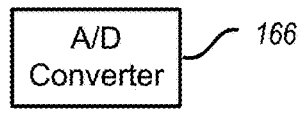

FIGS. 4a, 4b, 4c, 4d, 4e, and 4f show components for aiding in the understanding of various embodiments of the disclosure. More particularly, FIG. 4a shows a latch 156, FIG. 4b shows a bolt 158, FIG. 4c shows a mirror 160, FIG. 4d shows a seat 162, FIG. 4e shows a ventilation flap 164, and FIG. 4f shows an analog-to-digital (A/D) converter 166.

German patent application no. 102022107474.9, filed Mar. 30, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for detection of an end position of an actuator moved by an electric motor, the method comprising:
   actuating the electric motor using signal pulses;
   adding measured mutual induction voltages that are generated by the actuating; and
   detecting the end position in response to determining that a sum of the measured mutual induction voltages reaches a given value; and
   halting movement of the actuator upon detecting the end position in response to determining that the sum of the measured mutual induction voltages reaches the given value.

2. The method according to claim 1, wherein the given value is a value contingent upon a specific layout of the actuator that takes on a same value for a plurality of actuators of a model series.

3. The method according to claim 1, further comprising:
   before the actuating, storing, by a controller that is connected to the actuator, the given value,
   wherein the actuating, the adding, the detecting, and the halting are performed by the controller.

4. The method according to claim 1, wherein the actuator moves a latch or a bolt of a lock of a motor vehicle.

5. The method according to claim 1, wherein the actuator moves a mirror of a motor vehicle.

6. The method according to claim 1, wherein the actuator moves a seat of a motor vehicle or parts of the seat of the motor vehicle.

7. The method according to claim 1, wherein the actuator moves a ventilation flap of an air conditioning system of a motor vehicle.

8. A module, comprising:
   a controller;
   at least one electric motor; and
   at least one actuator that is movable by the at least one electric motor,
   wherein the controller includes a semiconductor full bridge connected to the at least one electric motor, and a read back input connected to a plurality of outputs of the semiconductor full bridge,
   wherein the read back input forwards a plurality of mutual induction voltages to an analog-to-digital (A/D) converter of the controller, and
   wherein the controller, in operation,
      adds up the mutual induction voltages,
      compares a sum of the mutual induction voltages to a given end value,
      detects an end position of the at least one actuator in response to determining that a sum of the mutual induction voltages reaches a given value, and halts movement of the at least one actuator upon detecting the end position in response to determining that the sum of the mutual induction voltages reaches the given value.

\* \* \* \* \*